Dec. 8, 1959 O. A. WANDEL 2,915,754
FASTENER DRIVING APPARATUS
Filed May 15, 1957 3 Sheets-Sheet 2
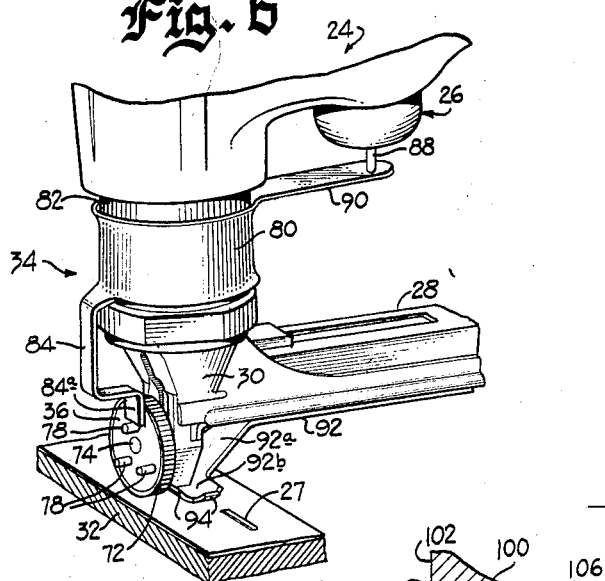
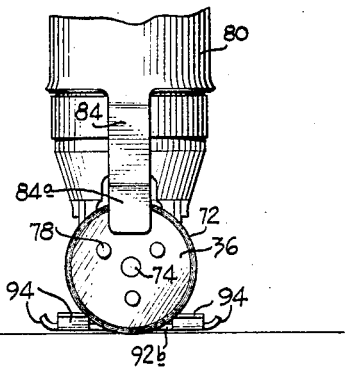
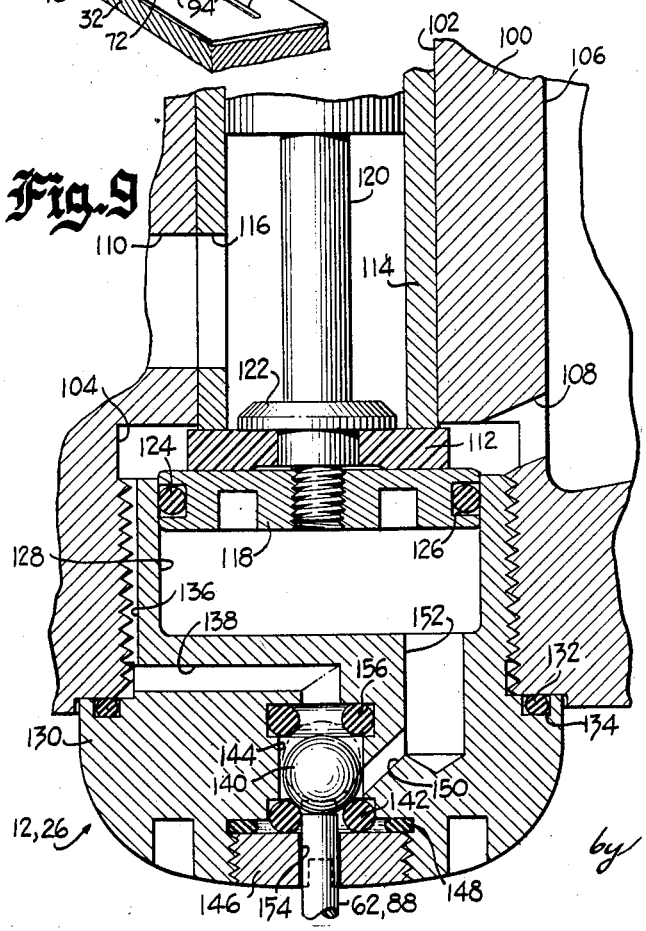
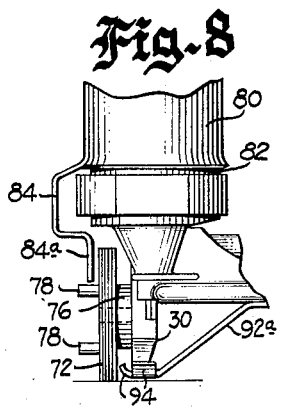
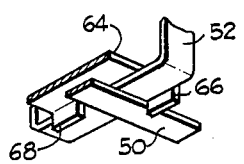
Inventor
Oscar A. Wandel
by Mason, Kolehmainen,
Rathburn and Wyss.
Attorneys.

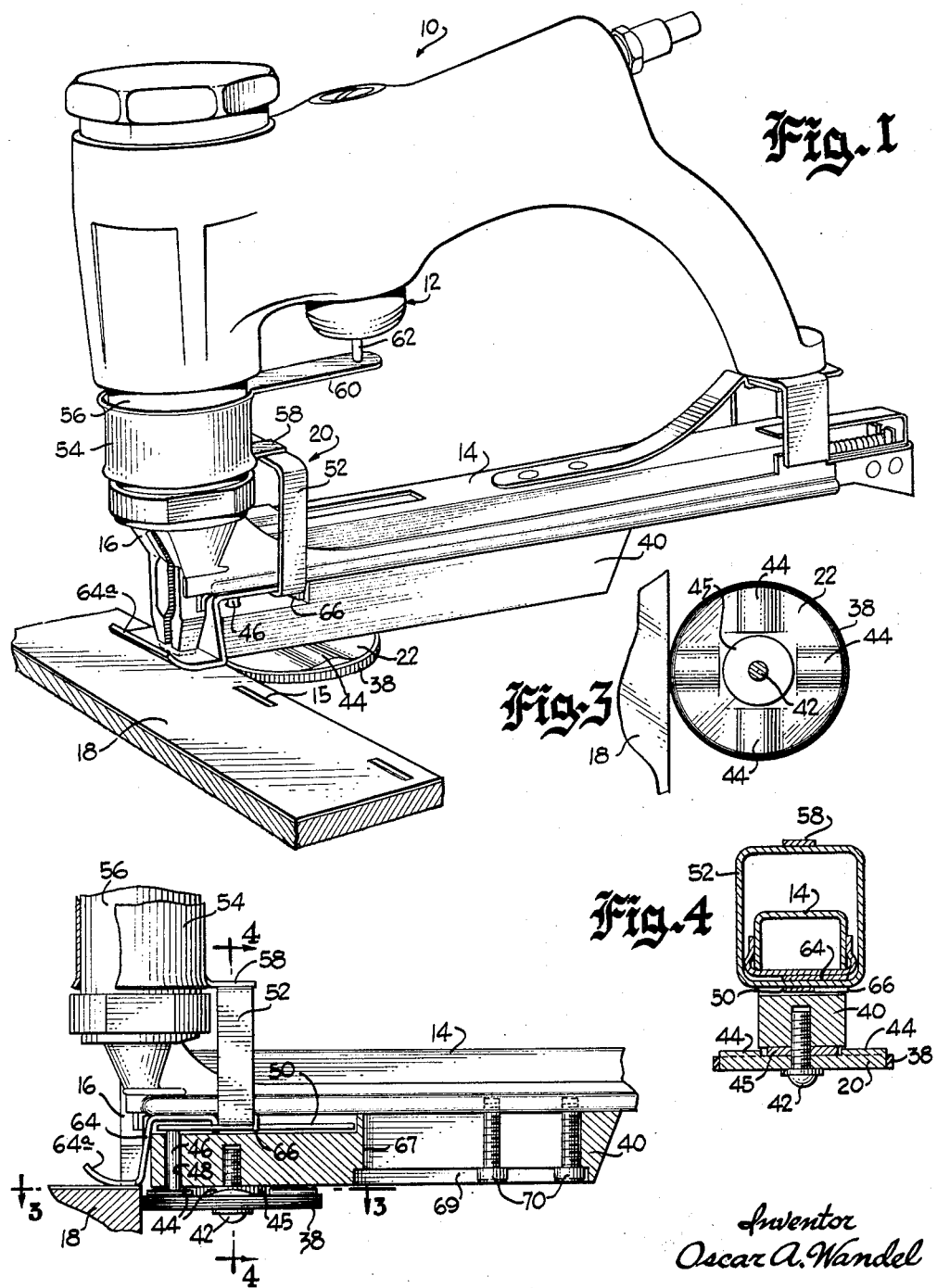

Dec. 8, 1959     O. A. WANDEL     2,915,754
FASTENER DRIVING APPARATUS
Filed May 15, 1957     3 Sheets-Sheet 3
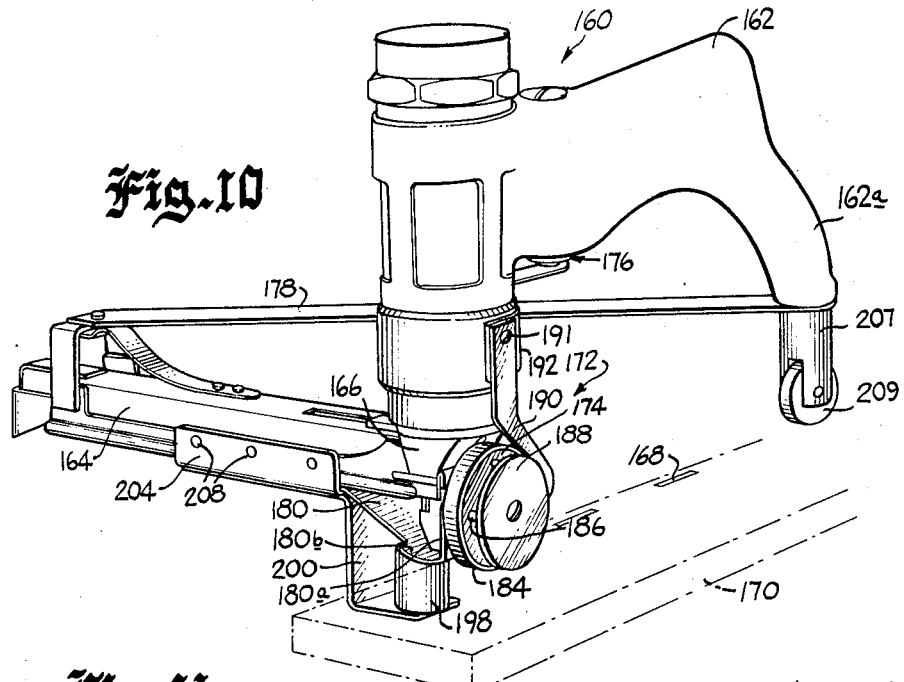
Fig. 10
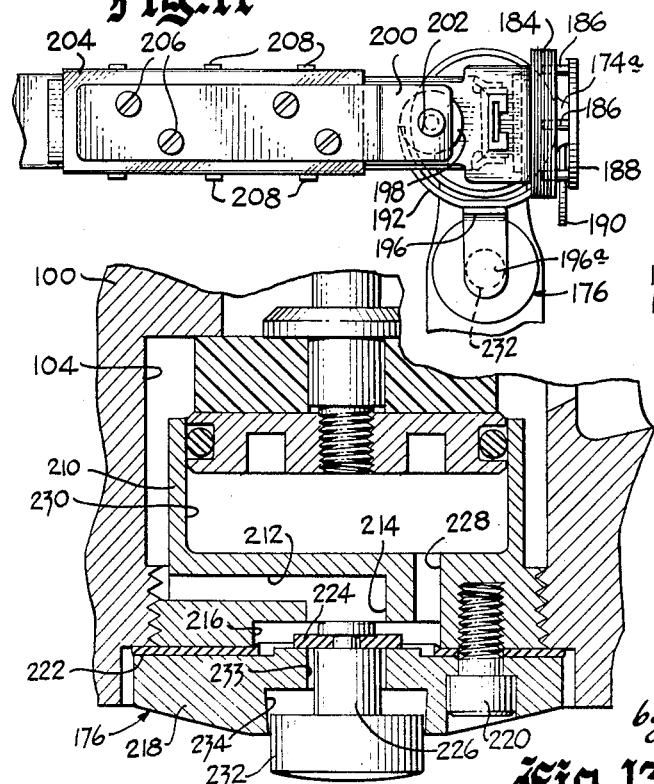
Fig. 11
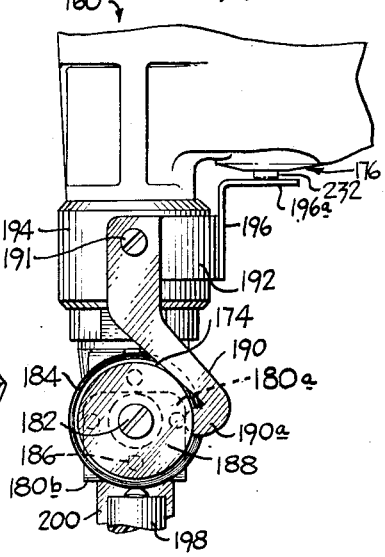
Fig. 12
Fig. 13
Inventor
Oscar A. Wandel
by Mason, Kolehmainen,
Rathburn and Wyss
Attorneys.

United States Patent Office 2,915,754
Patented Dec. 8, 1959

2,915,754

FASTENER DRIVING APPARATUS

Oscar A. Wandel, Mundelein, Ill., assignor to Fastener Corporation, Chicago, Ill., a corporation of Illinois Application May 15, 1957, Serial No. 659,384

28 Claims. (Cl. 1—106)

This application relates to a fastener driving apparatus and, more particularly, to such an apparatus having new and improved operating and control means.

Pneumatically operated tackers or staplers possess the capability of high speed and relatively effortless operation which adapts them for use in applications in fabricating and assembly operations where a large number of fastener driving operations must be performed in a relatively short period of time. However, existing devices of this type, which generally are operated by manual actuation of a trigger type control assembly, do not fully realize the advantages of speed and ease of operation of which the driving devices are capable. This is particularly true with respect to applications wherein the tackers perform a stitching type of operation in which a series of staples or similar fasteners are to be driven into a workpiece at uniformly spaced intervals. Further, manual manipulation of the hand tool in this type of fastening operation generally results in a lack of uniformity in the spacing of the fasteners.

Accordingly, one object of the present invention is to provide a new and improved fastener driving apparatus.

Another object is to provide such an apparatus including new and improved control actuating means.

Another object is to provide an operating assembly for fastener driving apparatus which is controlled by means in rolling contact with a workpiece.

A still further object is to provide a fastener driving device for quickly and easily controlling the driving of fasteners into a workpiece at uniformly spaced intervals.

Another object is to provide a fastener driving device operated at time spaced intervals in accordance with relative movement between a workpiece and a driving device.

Another object is to provide a fastener driving apparatus controlled by cam means in rolling contact with a workpiece.

Another object is to provide means for adapting manually controlled pneumatically operated tackers for automatic control in accordance with relative movement between a workpiece and the tacker.

In accordance with these and many other objects, the present invention comprises a pneumatically operated stapler or tacker including a control valve which, when operated, causes the tacker to drive a single fastener. In order to provide means for periodically operating the control valve at time spaced intervals in accordance with relative movement between the tacker and a workpiece, a control mechanism is provided including a wheel adapted to be placed in rolling contact with the workpiece. The wheel includes peripherally spaced cam surfaces, and the operating mechanism includes a cam follower so that, upon rotation of the wheel due to relative movement between the tacker and the workpiece, the cam follower is periodically actuated following successive predetermined increments of relative movement to actuate the control valve, whereby staples or other suitable fasteners are driven into the workpiece at uniformly spaced distances.

In one embodiment of the invention which is particularly adapted for use in providing a line of spaced fasteners closely adjacent an obstruction, such as a rib or flange, formed in the workpiece, the wheel is mounted on the tacker for rotation about an axis substantially parallel to and spaced from a drive track defined by a nosepiece. In this embodiment, the wheel is capable of being adjustably secured to the tacker at a plurality of positions spaced rearwardly from the drive track to allow the line of staples to be disposed at different selected distances from the edge of the workpiece. In a second embodiment, the workpiece engaging wheel is mounted for rotation about an axis substantially perpendicular to the drive track with its workpiece engaging edge substantially flush with the end of the nosepiece, thereby to permit the tacker to automatically drive a series of spaced fasteners into the workpiece without regard to the edge surface. In a third embodiment, the handle of the tacker is disposed at right angles to the magazine and is provided with a supporting wheel for engaging the workpiece conjointly with the cam wheel along a line in the direction of relative movement between the workpiece and the tacker, thereby to facilitate movement of the tacker. The third embodiment also includes a pivoted operator controlled by the cam wheel for periodically actuating the control valve.

Many other objects and advantages of the present invention will become apparent from a consideration of the following detailed description taken in conjunction with the accompanying drawings wherein:

Fig. 1 is a perspective view showing a first embodiment of the automatically operated fastener driving device of the present invention in conjunction with a workpiece;

Fig. 2 is a side elevational view, in partial section, of the fastener driving device illustrated in Fig. 1;

Fig. 3 is a cross-sectional view taken along line 3—3 in Fig. 2;

Fig. 4 is a cross-sectional view taken along line 4—4 in Fig. 2 assuming that the complete tacker construction is illustrated therein;

Fig. 5 is a fragmentary perspective view of a portion of an operating yoke and guide assembly embodied in the automatic control for the fastener driving device illustrated in Fig. 1;

Fig. 6 is a fragmentary perspective view of a second embodiment of the improved fastener driving means of the present invention shown in conjunction with a workpiece;

Fig. 7 is a front elevational view of the fastener driving device illustrated in Fig. 6;

Fig. 8 is a fragmentary side elevational view of the fastener driving device illustrated in Figs. 6 and 7;

Fig. 9 is an enlarged fragmentary cross-sectional view of a main control valve adapted for use in the fastener driving devices illustrated in Figs. 1 and 6 of the drawings;

Fig. 10 is a perspective view of a fastener driving device forming another embodiment of the present invention in which the magazine and the handle of the tacker are disposed at right angles to each other;

Fig. 11 is a fragmentary bottom view of the fastener driving device shown in Fig. 10;

Fig. 12 is a fragmentary front elevational view of the tacker shown in Fig. 10; and Fig. 13 is a fragmentary cross-sectional view of another embodiment of the main control valve illustrated in Fig. 9.

In general, the embodiment of the invention illustrated in Figs. 1–5 of the drawings includes a pneumatically operated fastener driving device, indicated generally as 10, having a main control valve 12 which, in response to each actuation thereof, operates the driving device or tacker 10 so that a staple 15 supplied from a magazine 14 is driven outwardly through the drive track in a nosepiece 16 into a workpiece 18. In order to operate the tacker 10 so that a spaced line of staples 15 is driven into the workpiece 18 at a selected distance from the edge thereof, a movement responsive or rolling trip control assembly 20 including a wheel 22 is provided. In operation, the wheel 22 is placed in contact with an edge of a workpiece 18 with the nosepiece 16 of the tacker 10 at any selected distance spaced inwardly from the edge of this workpiece. Thereafter, the tacker 10 is moved relative to the workpiece 18 so that the wheel 22 is rotated. Cam means provided on the wheel 22 operate the control assembly 20 so that the main control valve 12 is operated at spaced intervals determined by the spacing of the cams on the wheel 22, thereby to selectively operate the tacker 10 to drive a series of staples 15 into the workpiece 18 at uniform selected intervals. Since the wheel 22 does not contact the top surface of the workpiece 18, the tacker 10 is capable of driving staples closely adjacent a rib or flange in a workpiece 18 which would interfere with rotation of a cam wheel carried on the nosepiece of the tacker.

In the second embodiment of the invention shown in Figs. 6–8, there is provided a pneumatically operated tacker 24, similar to the tacker 10, having a main control valve 26 for selectively operating the tacker 24 so that, in response to each operation thereof, a staple 27 supplied by a magazine 28 is driven outwardly through a drive track in a nosepiece 30 into a workpiece 32. To provide a means for driving the staples 27 into the workpiece 32 at uniformly spaced intervals, an automatic control assembly 34 responsive to relative movement between the tacker 24 and the workpiece 32 is provided. The control assembly 34 includes a wheel 36 rotatably mounted on the nosepiece 30 which is adapted to be placed in a rolling contact with the workpiece 32. When relative movement is produced between the workpiece 32 and the tacker 24, cam means carried on the rotating wheel 36 periodically actuate the control assembly 34 so that the main control valve 26 is operated at time spaced intervals to cause the staples 27 to be driven into the workpiece 32 at uniformly spaced positions. Since the workpiece engaging edge or periphery of the wheel 36 is disposed substantially flush with the end of the nosepiece 30, as contrasted with the relative positions of the nosepiece 16 and the wheel 22 in the tacker 10, the tacker 24 is capable of being manipulated without regard to the edge of the workpiece 32, thereby to permit the staples 27 to be driven into this workpiece at positions remote from the edge thereof.

Referring now more specifically to the construction and arrangement of the tackers 10 and 24 and the nosepieces 16 and 30, these components are identical and may be of any of the types well known in the art, although they preferably are of the design embodied in the "Duo-Fast" direct drive air tackers manufactured and sold by the Fastener Corporation of Chicago, Illinois, and identified as Catalog Nos. DW–308 or DN–348, among others. In pneumatic tackers of this type, compressed air continuously supplied to a reservoir, such as that defined by a hollow handle, is selectively admitted to a piston chamber under the control of a main control valve, such as the valves 12 and 26, so that a fastener driving blade connected to a piston in this chamber is advanced at high speed. During this displacement, the end of the driver blade engages a staple supplied to a drive track in the nosepieces 16 and 30 from the magazines 14 and 28, respectively, and drives the engaged staple downwardly through the drive track into the workpiece 18 or 32. The piston and driver blade remain in this displaced position until such time as the control valve 12 or 26 are released to permit the piston and driver blade to be returned to their normal position by resilient or pneumatic means. The magazines 14 and 28 embodied in the above identified commercial direct drive air tackers comprise a housing from which staples or other similar fasteners are advanced into the drive tracks formed in the nosepieces 16 and 30 by resilient means, although many other suitable types of magazine construction may be utilized.

Referring now more specifically to the control assembly 20 which periodically operates the tacker 10 in response to predetermined relative movement between the workpiece 18 and the tacker 10 so that the staples 15 are driven into the workpiece 18 at uniformly spaced intervals and at a selected distance from the edge of the workpiece 18, the assembly 20 includes the wheel 22 which is provided with a peripherally extending band or tire 38 of frictional material, such as rubber, for engaging the workpiece 18. This wheel is rotatably mounted on a support 40 by a headed machine screw 42 extending substantially parallel to the nosepiece 16 or to the drive track defined thereby. A spacing washer 45 is interposed between a lower surface of the support 40 and the upper surface of the wheel 22. To provide a means for selectively operating the valve 12 after predetermined increments of relative movement between the tacker 10 and the workpiece 18, the upper surface of the wheel 22 is provided with four peripherally spaced and radially extending cam means or undulating surfaces 44. A cam follower responsive to movement of the cam means 44 is provided by a pin 46 slidably mounted in an opening 48 in the support 40, which opening is disposed in vertical alignment with the cam means 44 formed on the wheel 22.

In order to couple movement of the cam follower pin 46 to the main control valve 12, the control assembly 20 includes a force transmitting linkage comprising an elongated arm 50 which is secured to a yoke encircling the magazine 14. The yoke 52 is secured to a sleeve 54, which is slidably mounted on a cylindrical portion 56 of the body of the tacker 10, by means of a projecting tab 58. An arm 60 secured to an upper edge of the sleeve 54 supports, at its outer end, a valve operating pin 62 which is adapted to actuate the control valve 12. Thus, by virtue of the slidable mounting of the sleeve 54 on the cylindrical portion 56 of the body of the tacker 10, the force transmitting linkage is capable of reciprocating vertical movement for transmitting movement of the cam follower pin 46 to the main control valve 12.

In order to guide this vertical movement and to prevent rotary displacement of the sleeve 54, a combined guide and workpiece engaging shoe member 64 is provided which is secured to a lower wall of the magazine 14. The end of the member 64 which is displaced rearwardly from the nosepiece 16 is provided with a pair of downwardly extending tabs 66 and 68 (Fig. 5) between which the arm 50 is slidably mounted. Since the arm 50 is rigidly secured to the yoke 52 and thus to the sleeve 54, rotary displacement of the force transmitting linkage is positively prevented by the engagement of the arm 50 with either one of the downwardly projecting tabs 66 and 68. In order to facilitate sliding movement of the tacker 10 when in engagement with the workpiece 18, the forwardly disposed end of the member 64 is curved upwardly, as indicated at 64a, to provide a guide shoe. A centrally disposed portion of the curved element 64a is apertured to receive the lower end of the nosepiece 16, the lower end of which is substantially flush with the lower surface of the curved portion 64a of the member 64.

In order to permit the tacker 10 to drive lines of uniformly spaced staples 15 in the workpiece 18 at varying distances from the edge thereof, the support 40 on which the workpiece engaging wheel 22 is rotatably mounted is adjustably secured to the lower wall of the magazine 14. More specifically, the support 40 is provided with a slot 67 having an enlarged groove 69 formed therein which is adapted to receive the heads of a pair of fastening bolts 70. To adjust the support 40, the bolts 70 are loosened and the support 40 is shifted to the right or left, as viewed in Fig. 2, to a position such that, when the wheel 22 engages the vertically extending edge of the workpiece 18, the nosepiece 16 of the tacker 10 is properly spaced from the engaged edge of the workpiece. Thereafter, the bolts 70 are tightened to secure the support 40 to its adjusted position on the magazine 14. It is possible to adjust the support 40 toward and away from the nosepiece 16 and the drive track formed therein by virtue of the elongated arm 50 which is disposed in alignment with the cam follower pin 46. More specifically, the arm 50, which is movably mounted on the tacker 10 by the sleeve 54, is of such a length that the position of the cam follower pin 46 can be materially varied without moving this pin out of alignment with a portion of the arm 50.

In operation, the support 40 is first adjusted to a position in which the nosepiece 16 of the tacker 10 is positioned a proper distance from the edge of the workpiece 18, and the support 40 is then secured in this position, as described above. Thereafter, the tacker 10 is manually placed in engagement with the workpiece 18 with the rubber tired wheel 22 in engagement with one edge thereof and with the shoe 64a and the end of the nosepiece 16 in engagement with the other surface of the workpiece 18. The tacker 10 and the workpiece 18 are then moved relative to each other so that the wheel 22 is rotated. During rotation of the wheel 22, the lower end of the cam follower pin 46 moves into engagement with one of the cam surfaces 44, and this pin is displaced vertically upward, as viewed in Fig. 2, to engage and lift the arm 50. This vertical movement of the arm 50 is transmitted through the yoke 52 and the sleeve 54, which is slidably mounted on the cylindrical portion 56, to the arm 60 and the valve operating pin 62. This upward movement of the pin 62 operates the main control valve 12 so that the tacker is operated to drive a staple 15 into the workpiece 18.

As the wheel 22 is rotated beyond the point at which the cam means 44 engages the cam follower pin 46, compressed air in the valve 12 indirectly acting on the pin 62 forces the sleeve 54 and the yoke 52 downwardly to release the pneumatic tacker 10. The tacker 10 remains in this released condition until such time as the relative movement between the workpiece 18 and the tacker 10 again moves the pin 46 into engagement with the next cam means 44. Thus, the tacker 10 is periodically actuated to drive staples 15 into the workpiece 18 at uniformly spaced intervals determined by the spacing of the cams 44 on the wheel 22. Although the wheel 22 illustrated in Fig. 3 includes four cams 44, wheels 22 including varying numbers of cams 44 and having varying diameters can be provided in accordance with the spacing which is desired between the successive staples 15.

Referring now to the pneumatically operated tacker 24 (Figs. 6–8), the automatically controlled valve actuating assembly 34 is there provided for operating the main control valve 26 in accordance with relative movement between the tacker 24 and the workpiece 32 so that a series of uniformly spaced staples 26 can be driven into the workpiece 32. As indicated above, the assembly 34 includes and is controlled by the wheel 36. This wheel is provided with a peripheral band or tire 72 of rubber or similar frictional material to insure an adequate driving engagement between the wheel 36 and the workpiece 32. The wheel 36 is rotatably mounted on the nosepiece 30 of the tacker 24 by a stub shaft 74 extending substantially perpendicular to the drive track formed in the nosepiece 30. The stub shaft 74 is carried on a support 76 which is secured to the nosepiece 30 so that the lower or workpiece engaging edge of the wheel 36 is substantially flush with or slightly below the end of the nosepiece 30.

To provide a means for selectively actuating the control valve 26 following predetermined increments of relative movement between the tacker 24 and the workpiece 32, the wheel 36 is provided with a plurality of outwardly projecting pins 78. These pins are substantially parallel to the axis of the shaft 74 and are equally spaced from the axis of the shaft 74 and from each other in accordance with the distance which is to be provided between successive driven staples 27. Although the wheel 36 is shown as being provided with three projecting pins 78, it is obvious that a greater or lesser number thereof disposed at a greater or lesser radial distance from the axis of the shaft 74 can be provided to permit the staples 27 to be driven into the workpiece 32 at different spaced intervals.

To provide a means controlled by the pins 78 on the wheel 36 for operating the main control valve 26, the control assembly 34 includes a cam follower and force transmitting linkage including a sleeve 80, which is slidably mounted on a cylindrical portion 82 of the body of the tacker 24. An angularly offset arm 84 connected to the sleeve 80 extends downwardly and terminates in a right angularly offset end portion 84a which is disposed in the path of movement of the pins 78. Accordingly, when the wheel 36 is rotated due to relative movement between the workpiece 32 and the tacker 24, the pins 78 are successively moved into engagement with the end portion 84a of the arm 84 so that the arm 84 and the sleeve 80 are displaced vertically upward. During this upward movement, a pin 88 secured to an outer end of an arm 90, which is secured to the upper end of the sleeve 80, moves upwardly to engage and operate the main control valve 26, thereby causing operation of the tacker 24 to drive a staple 27 into the workpiece 32.

To facilitate sliding movement of the tacker 24, particularly of the nosepiece 30 thereof, relative to the workpiece 32, a guide shoe element 92 is provided. The rearwardly disposed end of the element 92 is secured to a lower wall of the housing of the magazine 28, and an intermediate portion 92a of the member 92 is inclined outwardly and downwardly to provide a support for a transversely elongated end portion 92b having a centrally disposed aperture through which the end of the nosepiece 30 extends. The portion 92b is provided with a plurality of upwardly and outwardly curved tabs 94 which serve to guide fabrics and similar flexible sheets of material beneath the nosepiece 30 and thus prevent this nosepiece from snagging the material and preventing smooth relative movement between the tacker 24 and the workpiece 32.

In operation, the pneumatic tacker 24 is manually disposed on the workpiece 32 with the rubber tire or band 72 on the wheel 36 in engagement with the workpiece. Thereafter, relative movement is produced between the workpiece 32 and the tacker 24, preferably by rolling the wheel 36 over the engaged surface of the workpiece 32, so that one of the pins 78 moves into engagement with the arm 84 and displaces it upwardly, thereby to slide the sleeve 80 on the cylindrical portion 82 and thus to elevate the arm 90 and the pin 88 carried thereon. This upwardly directed movement of the pin 88 operates the control valve 26 so that the tacker 24 is actuated to drive a staple 27 into the workpiece 32.

Continuing relative movement of the tacker 24 and the workpiece 32 causes rotation of the wheel 36 so that the engaged pin 78 moves out of engagement with the arm 84, thus permitting compressed air in the valve 26 acting on the pin 88 to force the arms 84 and 90 and the sleeve 80 downwardly so that the main control valve 26 is released. Upon release of the valve 26, the fastener driving blade and piston in the pneumatically operated tacker 24 are returned to their normal position to condition the apparatus 24 for another fastener driving operation. Continuing rotation of the wheel 36 due to relative movement between the workpiece 32 and the tacker 24 successively moves the pins 78 into engagement with the arm 84 so that the main control valve 26 is operated at timed intervals determined by the spacing of the pins 78. In response to each actuation of the valve 26, the pneumatic tacker 24 is operated to drive a staple 27 into the workpiece 32, each staple 27 being spaced a predetermined distance from the preceding staple 27. As contrasted with the operation of the tacker 10 and in view of the fact that the control wheel 36 engages the upper surface of the workpiece 32 rather than the edge surface as in the case of the wheel 22, the tacker 24 can be moved relative to the workpiece 32 in any desired manner, thereby permitting the staples 27 to be driven into this workpiece in any desired pattern.

In order to reduce the forces required to operate the main control valves 12 and 26 in the tackers 10 and 24, respectively, the valves shown in the above identified commercial construction may be replaced by an improved valve construction illustrated in Fig. 9 of the drawings in which virtually all of the force for opening the main valve is provided by the compressed air. As illustrated therein, a housing 100 for the tackers 10 and 24 is provided with a bore 102 and a counterbore 104. The handle of the housing 100 preferably forms a reservoir 106 which is normally supplied with air under pressure. This compressed air passes into the counterbore 104 through a passageway 108. However, the compressed air in the counterbore 104 is normally prevented from passing through the bore 102 to an outlet passageway 110 by a movable main valve element 112. The valve element 112 engages a tubular valve seat 114 which is disposed within the bore 102 and which is provided with an aperture 116 in alignment with the outlet passageway 110.

The main valve seat 112, which preferably comprises a resilient gasket, is secured to a control piston 118 by a valve stem 120 which is threadedly connected to the piston 118 and which is provided with an enlarged flange or collar 122 for compressing the resilient valve element 112 against the piston 118. The piston 118, which carries a resilient sealing O-ring 124 in an annular and peripherally extending recess 126, is slidably disposed within a chamber 128 formed in a valve cap 130. The valve cap 130 is threaded within the counterbore 104. Compressed air leakage from the counterbore 104 to the atmosphere through the threaded connection of the cap 130 and the housing 100 is prevented by a resilient O-ring 132 disposed in a groove 134 formed in the cap 130.

To provide a means for normally holding the control valve 12, 26 in its closed position, the threads on the cap 130 are undercut to provide a passageway 136 extending from the counterbore 104 to a passageway 138 formed in the cap 130. The compressed air supplied to the counterbore 104 flows through the passageways 136 and 138 to act on a ball valve 140 so as normally to displace this ball valve to the illustrated position in which it is held in seating engagement with a valve seat defining O-ring 142. The O-ring 142 is disposed within a shouldered portion of a cavity 144 defined by the cap 130 and is retained therein by a valve cover 146 which is threadedly mounted on the valve cap 130. Air leakage from the chamber 144 through the threaded connection of the valve cover 146 is prevented by a sealing gasket 148. Accordingly, with the ball valve 140 in the illustrated position, the compressed air supplied by the reservoir 106 flows through the passageway 108, the counterbore 104, and the passageways 136 and 138 to the chamber 144. This compressed air then flows through a passageway 150 and a bore 152, which opens into the chamber 128, to act on the lower surface of the piston 118. The compressed air in the chamber 128 urges the piston 118 upwardly to urge the resilient valve element 112 into seating engagement with the valve seat 114. Since the effective area of the lower surface of the piston 118 is vastly greater than the effective or exposed upper area of this piston, the provision of the compressed air within the cylinder 128 insures a firm seating of the valve element 112 on the valve seat 114.

When the tackers 10 and 24 are to be operated as described above, the control assemblies 20 and 34 move the pins 62 and 88 upwardly. The valve cover 146 is provided with a centrally disposed opening 154 which is adapted to receive the pins 62 and 88. Upon upward movement of these pins, the ball valve 140 is moved upwardly out of engagement with the O-ring 142 and into engagement with an O-ring 156, as illustrated in dot-dash outline in Fig. 9 of the drawings. The engagement of the ball valve 140 and the O-ring 156 closes off the above described path for supplying compressed air to the cylinder 128, and the movement of the ball valve 140 out of engagement with the O-ring 142 opens an exhaust passageway for the chamber 128. This exhaust passageway extends through the bore 152, the passageway 150, and the opening 154. By exhausting the interior of the cylinder 128, a pressure differential is produced across the piston 118 due to the compressed air supplied to the counterbore 104, thereby causing the piston 118 to move downwardly, as viewed in Fig. 9 of the drawings. This downward movement moves the resilient valve element 112 out of engagement with the valve seat 114 so that compressed air flows from the reservoir 106 through the passageway 108, the counterbore 104, the interior of the tubular valve element 114, the opening 116 and thence through the outlet passageway 110 to the piston driving chamber of the tackers 10 or 24. The admission of air to the piston driving chambers causes downward movement of the piston and its connected driver blade so that a staple 15 or 27 is driven into the workpieces.

When the displacing force is removed from the pins 62 and 88 under the control of the wheels 22 and 36, as described in detail above, the compressed air acting on the ball valve 140 moves it out of seating engagement with the O-ring 156 and moves it into seating engagement with the O-ring 142. The engagement of the ball valve 140 with the O-ring 142 closes off the above identified exhaust passageway, and the movement of the ball valve 140 away from the O-ring 156 opens the above described path for supplying compressed air from the counterbore 104 to the cylinder 128. This compressed air acts on the lower surface of the piston 118 to move it upwardly so that the valve element 112 is again moved into engagement with the valve seat 114, thereby closing off communication between the reservoir 106 and the outlet passageway 110. The compressed air in the cylinder 128 continues to maintain the main valve in a closed position until such time as the ball valve 140 is again displaced by the pins 62 and 88.

Therefore, the improved valve constructions 12 and 26 facilitate the speed and ease of operating the tackers 10 and 24 inasmuch as the only force required to operate these valves is the slight force necessary to displace the ball valve 140. In actual practice, it has been found that the ball valve 140 can be unseated by the application of a pressure of less than one pound. Further, since the movement of the valve element 112 is controlled by the piston 118 in accordance with the selected application of compressed air to the chamber or cylinder 128, the time required to operate the valves 12 and 26 is materially reduced.

Referring now to Figs. 10–12 of the drawings, therein is disclosed a third embodiment of the invention comprising a pneumatically operated tacker, indicated generally as 160. The tacker 160 includes a handle 162 to which is connected, at substantially a right angle, a magazine 164 for supplying staples to a drive track formed in a nosepiece 166. In order to periodically operate the tacker 160 so that a spaced line of staples 168 is driven into a workpiece 170, a control assembly indicated generally as 172 is provided. The control assembly 172 includes a cam wheel 174 which is adapted to be placed in rolling contact with the workpiece 170 and which operates the control assembly 172 so that a main control valve 176 is operated at time spaced intervals to cause the staples 168 to be driven into the workpiece 170 at predetermined distances from each other.

The construction of the tacker 160, insofar as the handle 162, the magazine 164, and the nosepiece 166 are concerned, is identical to the construction of the tackers 10 and 24 with the exception that the magazine 164 is secured to the handle portion 162 at substantially a right angle. It is possible to secure the magazine 164 to the handle 162 displaced at a right angle in either direction therefrom inasmuch as the nosepiece 166 on which the magazine 164 is carried is connected to the tacker 160 by a threaded connection, as embodied in the above identified commercial direct drive air tacker. In order to secure the magazine 164 to the handle 162 at a right angle position in which the magazine 164 is displaced at either side of the handle 162, a link 178 is provided. One end of the link 178 is secured to the magazine 164, and the other end of the link is secured to a depending portion 162a of the handle 162.

Referring now more specifically to the control assembly 172 for periodically operating the control valve 176, the assembly 172 includes the cam wheel 174. The wheel 174 is rotatably mounted on an upstanding leg 180a of a supporting bracket 180 by a machine screw or shaft 182 which extends outwardly substantially perpendicular to the drive track in the nosepiece 166. The other end of the bracket 180 is secured to a lower wall of the magazine 164, and an intermediate portion 180b of the supporting bracket 180 is apertured to receive the lower end of the nosepiece 166. The periphery of the wheel 174 is provided with a band or tire 184 of frictional material adapted to engage the surface of the workpiece 170. To provide cam means for selectively operating the assembly 172, four pins 186, which are equally peripherally and radially spaced, are supported on the wheel 174 projecting axially outward therefrom. To provide a guide for limiting movement of a cam follower adapted to engage the plurality of pins 186, a retaining disk or plate 188 is provided. The plate 188 is clamped against both the free ends of the pins 186 and a boss 174a formed integral with the wheel 174 by the machine screw 182.

In addition to the wheel 174, the control assembly 172 includes a pivoted operator linkage controlled by rotation of the cam wheel 174 for periodically operating the main control valve 176. This pivoted linkage comprises a cam follower arm 190 having a rounded end portion 190a which is disposed between the outer surface of the wheel 174 and the inner surface of the retaining plate 188. The rounded end 190a of the cam follower lever 190 is disposed in the path of movement of the cam pins 186 to be deflected upon engagement with the pins 186 when the wheel 174 is rotated in either direction. The upper end of the cam follower arm 190 is secured to one leg of a somewhat U-shaped yoke member 192, both ends of which are pivotally mounted on a collar 194 carried on the tacker 160 by a pair of pivot pins 191. A right angle arm 196 is secured to the bight portion of the yoke member 192 so that, upon deflection of the cam follower arm 190, an outer free end 196a of the arm 196 moves upwardly to engage and operate the main control valve 176.

To provide a means for guiding movement of the tacker 160 relative to the workpiece 170, a guide roller assembly is provided including a roller 198 which is rotatably mounted on the offset end of a bracket 200 by a pin 202. The other end of a bracket 200 is secured to a U-shaped channel member 204 by a plurality of screws 206 (Fig. 11). The U-shaped member 204 is slidably mounted on the magazine 164 so that the position of the roller 198 relative to the magazine 164 can be adjusted, thereby to permit the nosepiece 166 to be disposed at any selected point on the upper surface of the workpiece 170. In order to detachably secure the guide roller assembly in a predetermined position relative to the magazine 204, a plurality of set screws 208 are provided in each of the two sides of the channel member 204.

To facilitate moving the tacker 160 relative to the workpiece 170, a supporting or follower wheel 209 is provided. The wheel 209 is rotatably mounted within the bifurcated end of a post 207 which is secured to the lower end of the depending portion 162a of the handle 162. The axis of rotation of the wheel 209 is substantially parallel to that of the cam wheel 174 and is located generally rearwardly of the wheel 174.

Figure 13 of the drawings illustrates the main control valve 176 which is adapted for use with the tacker 160. This valve is similar to the control valves 12 and 26 illustrated in detail in Fig. 9 and comprises an insert which is threaded into the counterbore 104 in the housing 100 therein. More specifically, the insert comprising the control valve 176 includes a cylindrical body member 210 which is threadedly secured within the counterbore 104 in the housing 100 so that compressed air passes through a pair of connected passageways 212 and 214 into a valve chamber 216. The chamber 216 is closed by a valve cover 218 which is secured to the valve body 210 by a plurality of cap screws 220 with a gasket 222 interposed between the cover 218 and the valve body 210.

The compressed air admitted into the valve chamber 216 acts on a valve seal 224 secured to a rod or plunger 226 so that the valve seal 224 is normally held in engagement with the valve cover 218. The compressed air in the valve chamber 216 also passes through a passageway 228 into a piston chamber 230 formed by the valve body 210. The chamber 230 is adapted to slidably receive the piston 118 illustrated in Fig. 9 so that the compressed air in the cylinder 230 normally holds the main control valve in a closed condition, as described above in conjunction with the valves 12 and 26.

When the control assembly 172 is operated so that the arm 196a of the bracket 196 moves upwardly, a trigger button 232 secured to the outer end of the rod 226 is engaged and moved upwardly to move the valve seal 224 out of sealing engagement with the valve cover 218 and to move it into engagement with the valve body 210 immediately adjacent the end of the passageway 214. Movement of the valve seal 224 into engagement with the valve body 210 prevents the further admission of compressed air into the valve chamber 216 and the cylinder 230. The movement of the valve seal 224 out of engagement with the valve cover 218 opens an exhaust passageway so that the compressed air within the chamber 230 is exhausted to atmosphere, thereby producing a pressure differential across the piston 118 which, as described above, opens the main valve. The exhaust path for the compressed air in the cylinder 230 includes the passageway 228, the valve chamber 216, a pair of slots 233 formed in the valve cover 218, and a counterbore 234 which is adapted to receive the button 232. When the valve 232 is released, the compressed air acting on the valve seal 224 moves the plunger 226 and the trigger button 232 downwardly so that the exhaust passageway is closed and the above described fluid path for supplying compressed air to the cylinder 230 is again completed.

In operation, the handle 162 of the tacker 160 is displaced to the right or to the left of the magazine 164 and is secured in this position by the link 178. Thereafter the set screws 208 are loosened to permit the edge or guide roller 198 to be adjusted to a position in which the nosepiece 166 of the tacker 160 is disposed a selected distance inwardly from the edge of the workpiece 170. Following the tightening of the screws 208, the wheels 174 and 210 are placed in engagement with one surface of the workpiece 170, and the edge or guide roller 198 is disposed in engagement with a contiguous surface thereof.

When the tacker 160 is advanced either forwardly or rearwardly, as viewed in Fig. 10, the wheel 178 is rotated in a clockwise or counterclockwise direction so that one of the pins 186 moves into engagement with the rounded end portion 190a of the cam follower lever 190. This engagement by one of the pins 186 deflects the lever 190 in a counterclockwise direction (Fig. 12) so that the yoke 192 and the arm 196 are pivoted in a counterclockwise direction. This moves the leg 196a into engagement with the trigger button 232 so that the main control valve 176 is operated to actuate the tacker 160 to drive a staple 168 into the workpiece 170.

Continuing relative movement between the workpiece 170 and the tacker 160 moves the engaged pin 186 out of engagement with the cam follower lever 190 so that linkage in the control assembly 172 pivots in a clockwise direction to release the button 232. Releasing the button 232 restores the valve 176 to a normal position to release the tacker 160 so that the driver blade and piston therein are restored to their normal positions. Thereafter, continuing relative movement between the workpiece 170 and the tacker 160 results in successive actuations of the main control valve 176 by the control assembly 172 so that staples 168 are driven into the workpiece 170 at predetermined spaced intervals.

In summary, therefore, the pneumatic tackers 10, 24, and 160 of the present invention provide means for automatically driving fasteners into a workpiece at uniformly spaced intervals in accordance with the relative movement between the tacker and the workpiece and, to this end, include cam controlling wheels in rolling contact with the workpiece. Further, these tackers embody new and improved valve means 12, 16, and 176 which are responsive to a small operating force and thus facilitate the operation of these tackers under the control of the assemblies 20, 34, and 172. In addition, by adjustably positioning the wheels 22 and 198 on the tackers 10 and 160, these tackers can be used to provide a line of equally spaced staples 15 and 168 disposed a predetermined distance from the edge of the workpiece.

Although the present invention has been described in conjunction with a number of embodiments thereof, it is obvious that those skilled in the art may devise other embodiments and modifications which will fall within the spirit and scope of the principles of this invention.

What is claimed as new and is desired to be secured by Letters Patent of of the United States is:

1. An apparatus for driving fasteners into a workpiece comprising pneumatically operated fastener driving means having a control element for operating said driving means, rotatable means carried on said driving means and in rolling contact with said workpiece, and a mechanical linkage carried on said driving means and interposed between said rotatable means and said control element and controlled by said rotatable means for actuating said control element at time spaced intervals.

2. An apparatus for driving fasteners into a workpiece comprising pneumatically operated fastener driving means having a control valve, cam means rotatably mounted on said driving means and adapted to have rolling contact with said workpiece, and means including a cam follower controlled by said cam means for operating said control valve after predetermined rotary movements of said cam means.

3. The apparatus set forth in claim 2 in which said cam means comprises a wheel having an outer edge adapted to engage said workpiece and a plurality of peripherally spaced projecting portions on one side thereof.

4. An apparatus for driving fasteners into a workpiece comprising fastener driving means having a control valve, a wheel rotatably mounted on said driving means and adapted to have rolling contact with said workpiece, cam means carried on said wheel, and means including a cam follower controlled by said cam means for periodically operating said control valve to operate said driving means, whereby fasteners are driven into said workpiece at predetermined intervals.

5. An apparatus for driving fasteners into a workpiece comprising fastener driving means defining a guide surface, a control element for operating said driving means, control means carried on said driving means and adapted to have rolling contact with said workpiece, and connecting means controlled by said control means for selectively operating said control element, said connecting means including guide means in sliding engagement with said guide surface.

6. An apparatus for driving fasteners into a workpiece comprising a pneumatically operated fastener driving means including a cylindrical structure, a control valve for operating said driving means, a shaft carried on said driving means, a wheel rotatably mounted on said shaft and having a peripheral portion of frictional material adapted to engage said workpiece so that relative movement between said driving means and said workpiece rotates said wheel, spaced projections carried on one side of said wheel and extending generally in a direction parallel to said shaft, guide means at least partially embracing said cylindrical structure and slidably mounted thereon, and means actuated by said spaced projection and including said guide means for selectively operating said control valve.

7. An apparatus for driving fasteners into a workpiece having two sides forming an edge comprising fastener driving means having a nosepiece through which fasteners are advanced toward one side of the workpiece, a control element for operating said driving means, rotatable means actuated by rolling contact with the other of said sides, and means controlled by the movement of said rotatable means for periodically actuating said control element in response to successive increments of relative movement between said fastener driving means and said workpiece.

8. The apparatus set forth in claim 7 in which means are provided for permitting the rotatable means to be set at varied distances from the nosepiece.

9. An apparatus for driving fasteners into a workpiece comprising fastener driving means including a control element for operating said driving means, a linkage mounted on said driving means for operating said control element, a rotatably mounted wheel adapted to be placed in rolling contact with said workpiece and operable to actuate said linkage, and means for adjustably mounting said wheel in a plurality of different positions relative to said linkage.

10. An apparatus for driving fasteners comprising fastener driving means, control means movably mounted on said driving means for operating said driving means, a support mounted on said driving means, cam means rotatably mounted on said support, and a cam follower element movably mounted on said support and controlled by said cam means for operating said control means.

11. An apparatus for driving fasteners into a workpiece having two contiguous sides forming an edge comprising fastener driving means having a structure defining a drive track through which fasteners are driven into one side of said workpiece, a support carried on said driving means, a wheel mounted on said support for rotation about an axis substantially parallel to said drive track, said wheel being adapted to be placed in rolling contact with the other side of said workpiece, cam means on said wheel, a cam follower engaging said cam means and movably mounted on said support, and control means actuated by said cam follower for selectively operating said driving means.

12. The apparatus set forth in claim 11 including means for adjustably securing said support to said driving means at a plurality of different positions relative to said drive track with said control means in an operative relation with said cam follower so that said cam means is effective to control the driving of fasteners into said one side of said workpiece at a plurality of different selected distances from said other side of said workpiece.

13. The apparatus set forth in claim 11 in which said driving means includes a cylindrical portion and in which said control means includes guide means slidably mounted on said cylindrical portion.

14. The apparatus set forth in claim 11 in which said control means includes an elongated arm disposed adjacent said cam follower and extending substantially perpendicularly outward from said drive track.

15. An apparatus for driving fasteners into a workpiece comprising fastener driving means including structure defining a drive track through which fasteners are advanced into said workpiece, a wheel mounted for rotation about an axis substantially perpendicular to said drive track and adapted to engage said workpiece, cam means on said wheel, and control means controlled by said cam means for selectively operating said driving means.

16. The apparatus set forth in claim 15 in which said cam means includes a plurality of projecting portions mounted at peripherally spaced positions on said wheel.

17. The apparatus set forth in claim 15 in which said control means includes a cam follower slidably mounted on said driving means.

18. An apparatus for driving fasteners into a workpiece comprising fastener driving means including a nosepiece through which fasteners are advanced to said workpiece, a shaft carried on said apparatus and projecting outwardly from said nosepiece, a wheel rotatably mounted on said shaft and adapted to engage said workpiece, a plurality of cam elements carried on said wheel, and means controlled by said cam elements for selectively operating said driving means in accordance with rotation of said wheel.

19. In a fastener driving apparatus having a cylindrical body portion and a control valve, a sleeve slidably mounted on said body portion, means connected to said sleeve for operating said control valve, and rotatably mounted cam means for selectively moving said sleeve relative to said body portion to operate said valve.

20. In an apparatus for driving fasteners into a workpiece, which apparatus is controlled by a main valve, means including a freely movable valve element for controlling operation of said main valve, a wheel in rolling contact with said workpiece, and a linkage controlled by rotation of said wheel and including an element movable into and out of engagement with said valve element for selectively operating said apparatus.

21. An apparatus for driving fasteners into a workpiece comprising fastener driving means including a housing, a fastener magazine projecting outwardly from said housing at substantially a right angle thereto for feeding fasteners to said driving means, a pair of spaced wheels carried on said housing for movably supporting said driving means on said workpiece, and means controlled by at least one of said wheels for selectively operating said fastener driving means.

22. An apparatus for driving fasteners into a workpiece comprising fastener driving means including a drive track, a first wheel mounted for rotation about a first axis substantially perpendicular to said drive track and adapted to engage said workpiece, means controlled by said first wheel for operating said fastener driving means, and a second wheel mounted for rotation about an axis substantially parallel to said drive track and adapted to engage said workpiece to guide relative movement between said fastener driving means and said workpiece.

23. The apparatus set forth in claim 22 including a magazine extending outwardly from said drive track along a line substantially parallel to said first axis for supplying fasteners to said drive track.

24. The apparatus set forth in claim 22 including a third wheel rotatably mounted on said fastener driving means spaced from said first and second wheels and rotatable about an axis substantially parallel to said first axis for movably supporting said driving means on said workpiece.

25. An apparatus for driving fasteners into a workpiece comprising fastener driving means including a cylindrical body portion, a wheel rotatably mounted on said driving means and adapted to have rolling contact with said workpiece, cam means on said wheel, yoke means partially encircling said body portion and pivotedly mounted thereon, means for operating said fastener driving means adapted to be actuated by said yoke means, and a cam follower element connected to said yoke means and controlled by said cam means.

26. An apparatus for driving fasteners into a workpiece at spaced positions comprising a pneumatically operated fastener driving means having a drive track through which fasteners are successively advanced and driven into said workpiece, valve means for selectively controlling the application of compressed air to said fastener driving means to operate said driving means, a valve operator linkage mounted on said driving means and including a movable element for actuating said valve means, and control means mounted on said driving means and including an element in engagement with said workpiece and actuated in response to successive increments of relative movement between said workpiece and said driving means along a line within a plane substantially transverse to said drive track for operating said linkage so that said movable element operates said valve means in response to the completion of each successive increment of relative movement.

27. An apparatus for automatically driving successive fasteners into a workpiece in response to relative movement between the apparatus and the workpiece when the apparatus is maintained in a driving position adjacent the workpiece, comprising pneumatically operated fastener driving means having a fastener discharging opening adapted to be disposed adjacent said workpiece, movably mounted control means operated by relative movement between said apparatus and said workpiece along a path parallel to the workpiece while said fastener discharging opening is maintained adjacent said workpiece, and means connected to said control means and actuated by movement of said control means for operating said fastener driving means in response to successive increments of relative movement between said fastener driving means and said workpiece.

28. An apparatus for automatically driving successive fasteners into a workpiece in response to relative movement between the apparatus and the workpiece when the apparatus is maintained in a driving position adjacent the workpiece, comprising a pneumatically fastener driving means having a fastener discharging opening adapted to be disposed adjacent the workpiece, cam means including a plurality of spaced undulating surfaces, a cam follower movably mounted on said apparatus and engaging said cam means, said cam means and said cam follower being moved relative to each other in response to relative movement between said workpiece and said apparatus while said fastener discharging opening is maintained adjacent said workpiece, and means actuated by the successive engagement of said cam follower means by said undulating surfaces for operating said fastener driving means at time spaced intervals in response to successive increments of relative movement between said workpiece and said apparatus.

References Cited in the file of this patent

UNITED STATES PATENTS

| | | |
|---|---|---|
| 279,078 | Bushorr | June 5, 1883 |
| 1,677,927 | Pettee | July 24, 1928 |
| 2,660,724 | Thompson | Dec. 1, 1953 |
| 2,756,426 | Campbell | July 31, 1956 |
| 2,801,417 | Jenny | Aug. 6, 1957 |